March 26, 1963     E. G. O. OTTOSSON     3,083,035
VEHICLE SAFETY BELT AND BUCKLE HOLDER DEVICE
Filed Nov. 21, 1961                               4 Sheets-Sheet 1

Inventor:
Eric Gunnar Ossian Ottosson
By KARL W. FLOCKS
Attorney

March 26, 1963  E. G. O. OTTOSSON  3,083,035
VEHICLE SAFETY BELT AND BUCKLE HOLDER DEVICE
Filed Nov. 21, 1961  4 Sheets-Sheet 2

Inventor:
Eric Gunnar Ossian Ottosson
By Karl W. Flocks
Attorney

March 26, 1963  E. G. O. OTTOSSON  3,083,035
VEHICLE SAFETY BELT AND BUCKLE HOLDER DEVICE
Filed Nov. 21, 1961  4 Sheets-Sheet 3

Inventor:
Eric Gunnar Ossian Ottosson
By Karl W. Flocks
Attorney

March 26, 1963 E. G. O. OTTOSSON 3,083,035
VEHICLE SAFETY BELT AND BUCKLE HOLDER DEVICE
Filed Nov. 21, 1961 4 Sheets-Sheet 4
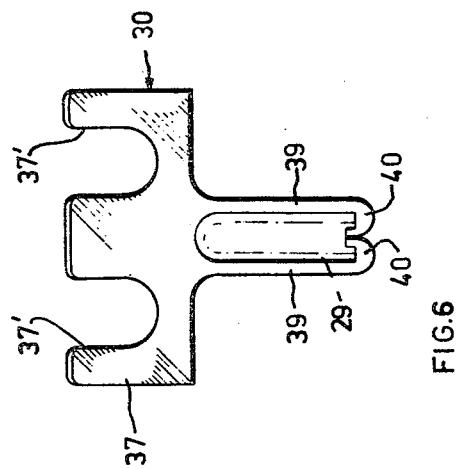
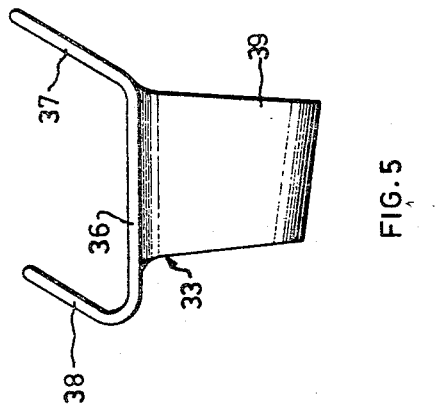
Inventor:
Eric Gunnar Ossian Ottosson
By Karl W. Flocks
Attorney United States Patent Office 3,083,035
Patented Mar. 26, 1963

3,083,035
VEHICLE SAFETY BELT AND BUCKLE
HOLDER DEVICE
Eric Gunnar Ossian Ottosson, Kyrkogatan 1,
Klippan, Sweden
Filed Nov. 21, 1961, Ser. No. 153,891
Claims priority, application Sweden Nov. 22, 1960
5 Claims. (Cl. 280—150)

To serve their purpose in the manner intended safety belts in vehicle should be so designed and disposed as not to cause irritation resulting in the driver and the passengers neglecting to put on their safety belts for shorter drives, particularly in town traffic. In safety belts where two straps are detachably fastened together by means of a buckle including a locking tongue on one strap and a lock housing on the other, such irritation will be felt when the strap carrying the lock housing slides off the seat when the latter is not held in position of use by engagement with the locking tongue, and still more irritating it is not to have said strap readily accessible for use in putting on the safety belt. This most frequently happens in vehicles having separate front seats.

To eliminate this disadvantage in such safety belts in which the lock housing of the buckle is provided with one or more projections and the locking tongue is formed with one or more apertures to accommodate the projection or projections in locking engagement therewith, it is suggested according to the present invention fixedly to arrange in the vehicle a holder for supporting the lock housing when it is separated from the locking tongue, said holder having at least one freely extending tongue which is adapted to be received in the lock housing and which has the edge of its freely extending end formed with one or more recesses in which to receive the projection or projections in the lock housing, thus permitting engagement and disengagement of the lock housing from the holder tongue without intervention of the locking means arranged in the lock housing for coaction with the locking tongue and without actuation of said means even if the lock housing is in locking position.

For a better understanding of the invention one embodiment thereof will be described more fully in the following with reference to the accompanying drawings in which:

FIGS. 5 and 6 are a side elevational view and an end elevational view, respectively, of the holder shown in FIGS. 1 and 2.

Figure 1:
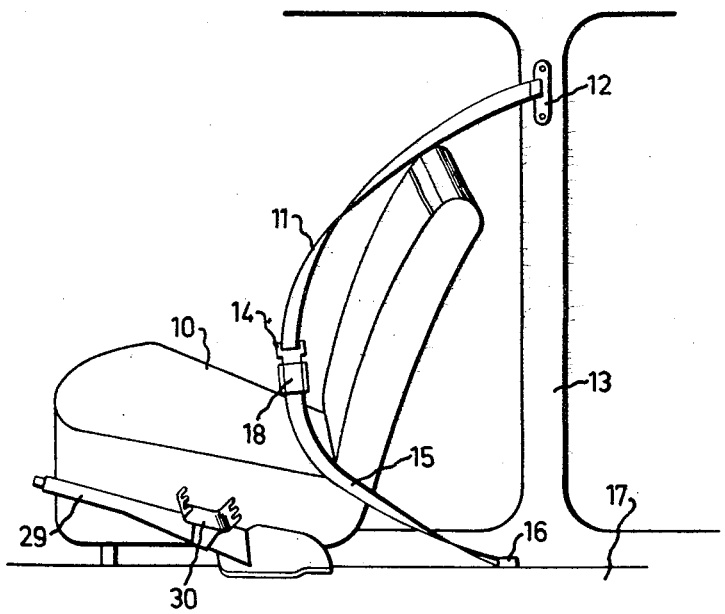
FIG. 1 is a side elevational perspective view of a vehicle seat with a safety belt.

The safety belt shown in FIG. 1 is mounted in connection with a seat 10 and includes an upper belt strap 11 which at one end has sewn thereto a metal fitting 12 secured to a door post 13 of the vehicle body on one side of the seat above and behind it, and at the other end has sewn thereto a locking tongue 14, and a lower belt strap 15 which likewise at one end has sewn thereto a metal fitting 16 secured to a gear box tunnel 17 formed by the floor structure of the vehicle body on the other side of, and behind, the seat, and has a lock housing 18 affixed to its other end. In the position of use shown in FIG. 1 the two belt straps are detachably fastened together by means of the buckle formed by the locking tongue and the lock housing and thus constitute a continuous belt which runs diagonally over the chest of the person using it and which is safely anchored in the vehicle body.

Figure 3:
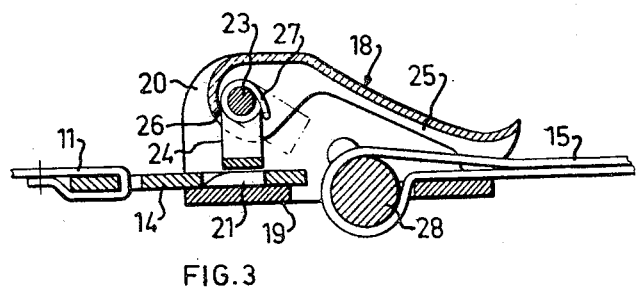
FIG. 3 is a longitudinal sectional view, on a larger scale, of the buckle secured to the safety belt.
Figure 4:
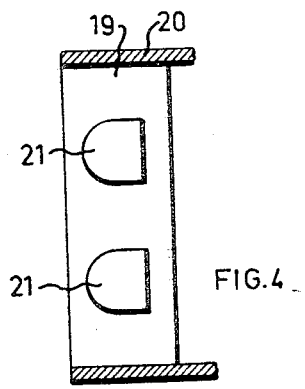
FIG. 4 is a fragmentary plan view, partly in section, of a lock housing which is a constituent part of the buckle and which has locking studs provided thereon.

The buckle 14, 18 may be conventional in character and is shown in broad outline in FIGS. 3 and 4. The lock housing 18 comprises a U-shaped frame with web 19 and limbs 20. Arranged on the web is a pair of locking studs 21 for locking engagement with apertures 22 in the locking tongue 14 insertable between the limbs 20. Pivotally mounted by means of a shaft 23 which extends between the limbs 20, is a U-shaped latch means 24 which in the latching position shown extends with its web over the locking studs 21 and the locking tongue 14 engaged therewith and prevents raising of the locking tongue from the locking studs and thus withdrawal of the locking tongue from the lock housing. By raising a lever 25 mounted for pivotment on shaft 23 and against which latch means 24 is kept applied at 26 by means of a coil spring 27 which is passed onto shaft 23 and has one end secured to said shaft and its other end bearing against the latch means, the latch means is swingable against the action of spring 25 to the free position shown by dash lines in FIG. 3, in which position the locking tongue 14 can be withdrawn from lock housing 18. According to FIG. 3, belt strap 15 is fastened in the web 19 of the frame by means of a shiftable tensioning roller 28.

Figure 2:
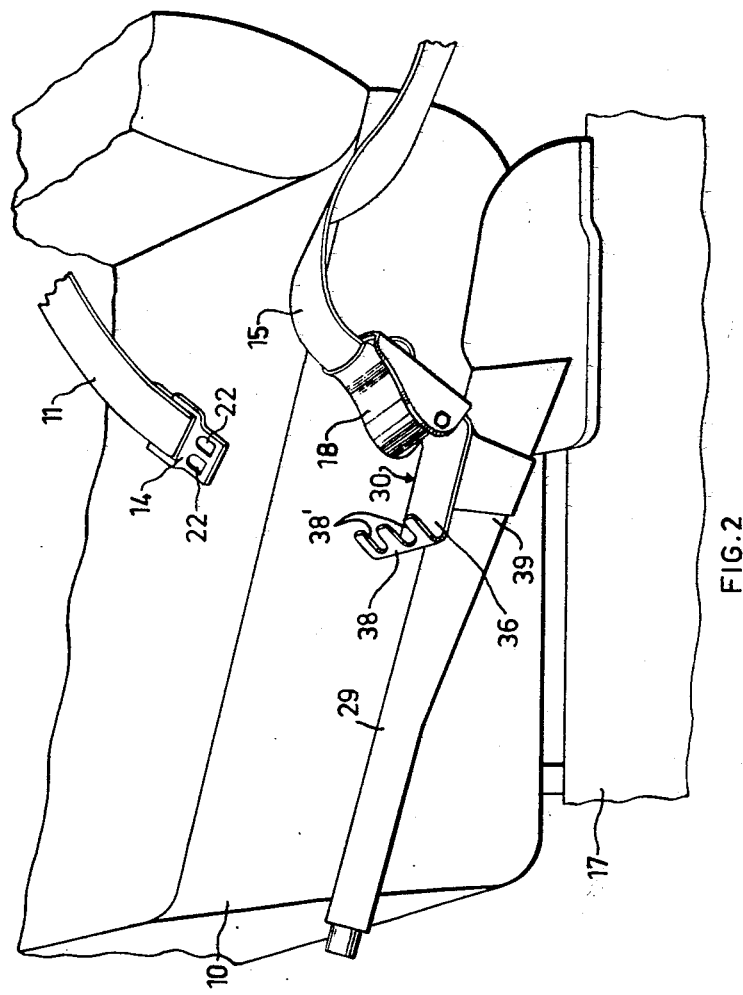
FIG. 2 is a side elevational perspective view, on a larger scale, of the lower portion of the seat and a hand-brake lever located close to said seat and having mounted thereon a holder for two safety belts.

As will appear from FIGS. 1 and 2, a holder 30 for receiving the lock housing 18, as shown in FIG. 2, when it is not in use and is separated from the locking tongue, is secured to a hand-brake lever 29 arranged on the gear box tunnel 17 beside the front seat 10.

The design of holder 30 is best apparent in its details from FIGS. 5 and 6. The holder is intended to support two lock housings and consists of a single piece of plastic material 33, preferably a non-rigid plastic, and comprises a plate 36 and two parallel tongues 37 and 38 projecting from one side of plate 36 and making an oblique angle with it. Tongues 37 and 38 are of the same width as the locking tongue 14. At the edge of its freely extending end each of tongues 37, 38 is formed with a pair of recesses 37' and 38', respectively, for accommodating therein the locking studs 21. At its opposite sides plate 36 has a pair of projecting arms and flanges 39 with facing hooks 40 at the free ends of said arms or flanges. This embodiment of the holder is for securing the holder to a hand-brake lever of U-shaped cross section adjacent its pivotally mounted end. In the position shown in FIGS. 1 and 2 the holder straddles the hand-brake lever by means of arms or flanges 39 which embrace the edges of the lever with their hooks 40, as is shown in FIG. 6 where lever 29 is indicated in cross section by dash lines.

Of course, the holder 30 and particularly the means for securing it in the vehicle may be designed otherwise according to the prevailing circumstances, and in case use cannot be made of hand-brake lever 29 for securing the holder 30 the latter may wholly dispense with arms or flanges 39 and be screwed with its plate 36 direct in the vehicle body, e.g. to gear box tunnel 17.

A usual arrangement, however, is that a hand-brake lever of U-shaped cross section is located between a pair of separate front seats, and in that case the embodiment herein described may be utilized to advantage.

When lock housing 18 is passed onto or removed from either holder tongue 37 or 38, the locking studs 21 are received in the recesses 37' and 38', respectively, without it being necessary to actuate the latch means 24, and the lock housing can therefore be passed onto and removed from the holder tongue without intervention of the locking means in the lock housing even if the latter is in locking position. Moreover, when the lock housing is in position on the holder tongue the spring 27 biasing the latch means 24 is not loaded.

What I claim and desire to secure by Letters Patent is:

1. In a vehicle a safety belt comprising at least two straps anchored in said vehicle at one end and a buckle including a locking tongue on the other end of one of said straps and a lock housing on the other end of the other one of said straps, the lock housing being provided with at least one projection and the locking tongue forming at least one aperture to accommodate said projection in locking engagement therewith when the locking tongue is inserted into the lock housing; and a holder for said lock housing when separated from said locking tongue comprising means fixedly securing said holder in said vehicle, and at least one projecting tongue insertable into said lock housing and forming at least one recess which is open at the free end of the projecting tongue and is sized to receive the projection of said lock housing.

2. In a vehicle a safety belt comprising at least two straps anchored in said vehicle at one end and a buckle including a locking tongue on the other end of one of said straps and a lock housing on the other end of the other one of said straps, the lock housing being provided with at least one projection and the locking tongue forming at least one aperture to accommodate said projection in locking engagement therewith when the locking tongue is inserted into the lock housing, an operating lever in said vehicle; and a holder for said lock housing when separated from said locking tongue comprising means fixedly securing said holder on said operating lever and at least one projecting tongue insertable into said lock housing and forming at least one recess which is open at the free end of the projecting tongue and is sized to receive the projection of said lock housing.

3. In a vehicle a safety belt comprising at least two straps anchored in said vehicle at one end and a buckle including a locking tongue on the other end of one of said straps and a lock housing on the other end of the other one of said straps, the lock housing being provided with at least one projection and the locking tongue forming at least one aperture to accommodate said projection in locking engagement therewith when the locking tongue is inserted into the lock housing; an operating lever in said vehicle, at least part of said operating lever having U-shaped cross section; and a holder for said lock housing when separated from said locking tongue comprising hook portions embracing the free edges of the part of the operating lever having U-shaped cross section thereby fixedly securing said holder to said lever, and at least one projecting tongue insertable into said lock housing and forming at least one recess which is open at the free end of the projecting tongue and is sized to receive the projection of said lock housing.

4. In a vehicle at least one seat; at least one safety belt comprising at least two straps anchored in said vehicle at one end and a buckle including a locking tongue on the other end of one of said straps and a lock housing on the other end of the other one of said straps, the lock housing being provided with at least one projection and the locking tongue forming at least one aperture to accommodate said projection in said aperture in locking engagement with said projection when the locking tongue is inserted into the lock housing; a brake operating lever disposed at one side of said seat at least part of said brake operating lever having U-shaped cross section; and a holder for said lock housing when separated from said locking tongue comprising a plate, a pair of hook portions projecting from said plate at one side thereof and embracing the free edges of the part of the brake operating lever having U-shaped cross section thereby fixedly securing said holder to said lever, and at least one tongue projecting from said plate at the opposite side thereof, said tongue being insertable into said lock housing and forming at least one recess which is open at the free end of the projecting tongue and is sized to receive the projection of said lock housing.

5. As an article of manufacture the combination of a plate, a pair of arms projecting from said plate at one side thereof spaced from each other and being formed at their free ends into hook portions turned against each other, and two tongues projecting from said plate at the opposite side thereof spaced from each other, each of said tongues forming at least one recess which is open at the free end of the tongue.

References Cited in the file of this patent

UNITED STATES PATENTS

| | | |
|---|---|---|
| 2,349,019 | O'Keeffe | May 16, 1944 |
| 2,932,871 | Phillips et al. | Apr. 19, 1960 |
| 2,965,942 | Carter | Dec. 27, 1960 |

FOREIGN PATENTS

| | | |
|---|---|---|
| 1,232,865 | France | Apr. 25, 1960 |
| 176,102 | Sweden | July 18, 1961 |